(12) United States Patent
Subramanian (10) Patent No.: US 8,891,549 B1
(45) Date of Patent: Nov. 18, 2014

(54) METHOD AND APPARATUS FOR CONTENT PROCESSING APPLICATION ACCELERATION

(75) Inventor: Siva Subramanian, Boston, MA (US)

(73) Assignee: Rockstar Consortium US LP, Plano, TX (US)

( * ) Notice: Subject to any disclaimer, the term of this patent is extended or adjusted under 35 U.S.C. 154(b) by 3015 days.

(21) Appl. No.: 10/692,842

(22) Filed: Oct. 24, 2003

Related U.S. Application Data (60) Provisional application No. 60/421,009, filed on Oct. 24, 2002.

(51) Int. Cl.
*H04L 12/66* (2006.01)

(52) U.S. Cl.
USPC ............................................... 370/463

(58) Field of Classification Search
None
See application file for complete search history.

(56) References Cited

U.S. PATENT DOCUMENTS

| | | | | |
|---|---|---|---|---|
| 6,741,595 | B2 * | 5/2004 | Maher et al. | 370/392 |
| 7,031,297 | B1 * | 4/2006 | Shabtay et al. | 370/352 |
| 7,042,870 | B1 * | 5/2006 | Albert et al. | 370/351 |
| 7,142,539 | B2 * | 11/2006 | Grinfeld | 370/392 |
| 2003/0198189 | A1 * | 10/2003 | Roberts et al. | 370/252 |
| 2005/0175003 | A1 * | 8/2005 | Craft et al. | 370/389 |

* cited by examiner

*Primary Examiner* — Gregory Sefcheck
(74) *Attorney, Agent, or Firm* — Anderson Gorecki & Rouille LLP (57) ABSTRACT

A network architecture enables the data flow of packets to be dynamically modified depending upon the operational needs of the packet being processed. This allows for separate processing of control and data path operations, as well as providing a mechanism for functions that require high computational support, such as encryption functions for example, to be offloaded onto processing devices that can support such functions. Other, less computationally intensive or lower priority functions can be forwarded to PEs having lower operation capacity. With such an arrangement, a dynamic mechanism is provided for customizing the data path of a network device to accommodate the computation needs of any application.

16 Claims, 8 Drawing Sheets

Prior Art Appliance Architecture

FIGURE 2a

Prior Art Switch architecture

METHOD AND APPARATUS FOR CONTENT PROCESSING APPLICATION ACCELERATION

CROSS REFERENCE TO RELATED APPLICATIONS

This invention claims priority to patent application Ser. No. 60/421,009 Filed Oct. 24, 2002, entitled "Content Processing Application Acceleration" by Subramanian.

FIELD OF THE INVENTION

This invention relates generally to the field of communication and more specifically to a method and apparatus for communications content processing.

BACKGROUND OF THE INVENTION

Content Delivery Services (CDS) are applications that enable or enhance the quality of experience of the end-to-end transfer of data over a network. For example, Content Delivery Services include Security Processing, Virus Scanning, Policy Enforcers, Load Balancing, Network Address Translation processing and Streaming Content Caches. In the past the content delivery services have been layered on top of the services provided on an end system. However, executing the CDS on the end system adversely impacts the ability of the end system to perform its intended function, which reduces the performance and increases the cost of the end systems themselves. To overcome these problems, the provision of Content Delivery Services has migrated from the end user systems to the network edge.

However, network edge architecture is designed to optimize the performance potential of the communication medium, and therefore is not always the best architecture for providing high quality Content Delivery Services. Typically Content Delivery Services are provided at the edge by appliances that are either pure software or hardware assisted software processes. While software processing enables a larger number of individual appliance offerings to be made to the user, it does not provide the optimum per appliance performance, and is also inefficient in terms of power, area and cost. Hardware assisted architectures typically include one or more customized ASICs coupled to the network device via an external bus architecture, such as the Peripheral Computer Interconnet (PCI) bus. The customized ASICs are designed such to provide optimal per appliance performance. However, if multiple appliances are provided in the network offering, bottlenecks quickly arise at the PCI interface. In addition, the hardware assisted architectures are expensive, and inefficient in terms of power, area and cost.

It would be desirable to identify a network architecture which would support the offering of various Content Delivery Services appliances while enabling desired power, area, cost and bandwidth constraints to be met.

SUMMARY OF THE INVENTION

According to one aspect of the invention, a network device includes a network interface for transferring a packet between the network device and a network, at least two processing engines, and a frame steering processor, disposed between the network interface and the at least two processing engines. The frame steering processor is programmed to forward a packet received at the frame steering processor to either the network interface card or one of the at least two processing engines responsive to a treatment characteristic of the packet.

According to another aspect of the invention, a method of processing packets received at a network device includes the steps of receiving a packet at a network interface of the network device and forwarding the packet to a frame steering processor, coupled to the network interface. The frame steering processor acts, responsive to a treatment characteristic of the packet, to forward the packet to either one of at least two processing engines or the network interface.

According to still a further aspect of the invention, a method of architecting a network device includes the steps of apportioning a plurality of functions to be performed by the network device into a plurality of groupings based on the relative complexity of the functions. At least one of the functions is a frame steering function. The method includes the steps of selecting processing devices for performing the functionality of each grouping of the plurality of groupings, the processing devices being selected based on predetermined design criteria. The selected processing devices are coupled with a frame steering processing device associated with the frames steering function, wherein the frame steering processing device includes switch functionality for forwarding a packet received at an input of the frame steering device to one of the selected processing devices in response to a tag value of the packet. The method further includes the step of programming each of the processing devices to control the flow of packets through the frame steering processor by updating the tag value of the packet when it is received at the respective processing device. With such an arrangement, the network device can be programmed to ensure that packets are forwarded to the appropriate type of processing device depending upon the operating needs of the packet. Network specific packets can be forwarded to network specialized processing engines, control type functions can be forwarded to high performance processing devices, and data path type functions can be performed within the frame steering processor itself, or at a dedicated frame steering processor. Because each CDS has different needs, the flow through the network device can be customized to the exact need of the application. Thus, this flexible, dynamic architecture allows Content Delivery Services to be provided in a network where the high performance capacities are realized.

DETAILED DESCRIPTION

Figure 1:
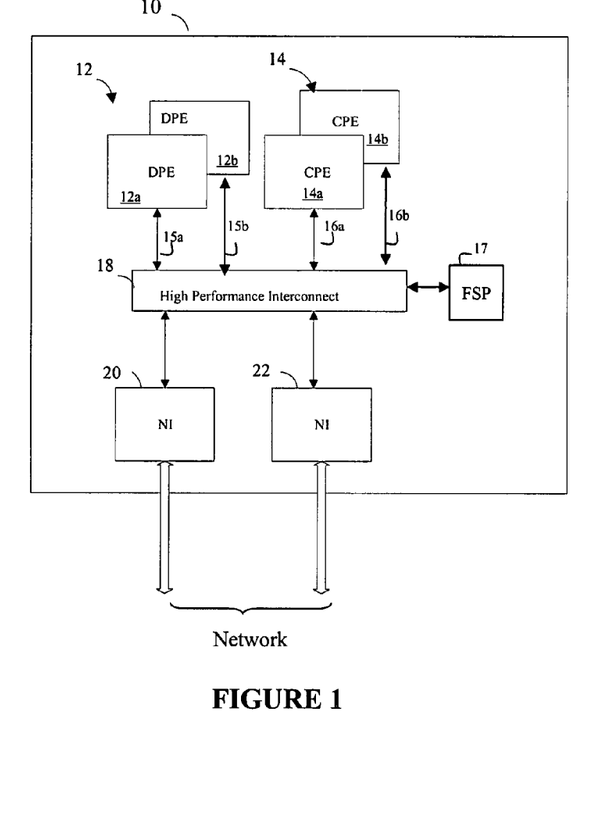
FIG. 1 is a block diagram of a network architecture for optimizing performance of content delivery services.

Referring now to FIG. 1, a modular Content Delivery Services (CDS) network gateway architecture 10 is shown. The modular architecture 10 includes a number of Data Processor Engines (DPEs) 12 and a number of Control Processing Engines (CPEs) 14 coupled via interconnects 15 and 16, respectively to a high performance interconnect 18. The high performance interconnect is coupled to one or more network interfaces 20 and 22 enabling communication between the CPEs and DPEs and a network.

According to the present invention, the network gateway architecture 10 may be designed to include DPEs and CPEs having a range of processing engine capabilities. Thus, DPE 12a may provide more capabilities or perform at a higher speed than DPE 12b. In addition, the interconnects that couple the various DPEs and CPEs to the high performance interconnect may have different bandwidth capabilities, or different physical designs. In one embodiment, the range of processing capabilities and interconnect types is selected to provide features that would support a variety of appliances. Selection of the particular DPE or CPE component can be streamlined to provide optimum performance for each particular appliance by programming the datapath taken by the respective packets or data flows through the architecture.

According to one aspect of the invention, the path that a particular packet or data flow takes through the network gateway architecture 10 is programmable, thus providing a flexible architecture that can support either (or both) of packet based and flow based processing. The steering of a packet or flow through a particular path of the DPEs and CPEs is controlled by a tag that is appended to each packet that is forwarded through gateway. In one embodiment, a CPE or DPE that receives a packet is programmed to process the packet and modify the tag on a packet to direct the packet to another CPE or DPE in the gateway for processing. Alternatively, the tagging function may be centralized in a single entity performing the function of a FSP. The FSP may prepend all the required tags before any processing begins allowing a tagged packet to be routed among various CPEs and DPEs or it may prepend one tag (denoting one CPE or DPE) and modify it when it gets the packet back and repeat until all required processing has been completed With such an arrangement, the flow of packets through the gateway may be dynamically modified depending upon the operational needs of the appliance associated with the packet being processed. This permits one architecture to easily support a wide range of appliances, each having different computational needs. For example, such an arrangement allows for separate processing of control and data path operations, as well as providing a mechanism for functions that require high computational support, such as encryption functions for example, to be offloaded onto processing devices that can support such functions. Other, less computationally intensive or lower priority functions can be forwarded to PEs having lower operation capacity. With such an arrangement, a dynamic mechanism is provided for customizing the data path of a network device to accommodate the computation needs of any application.

Figure 2A:
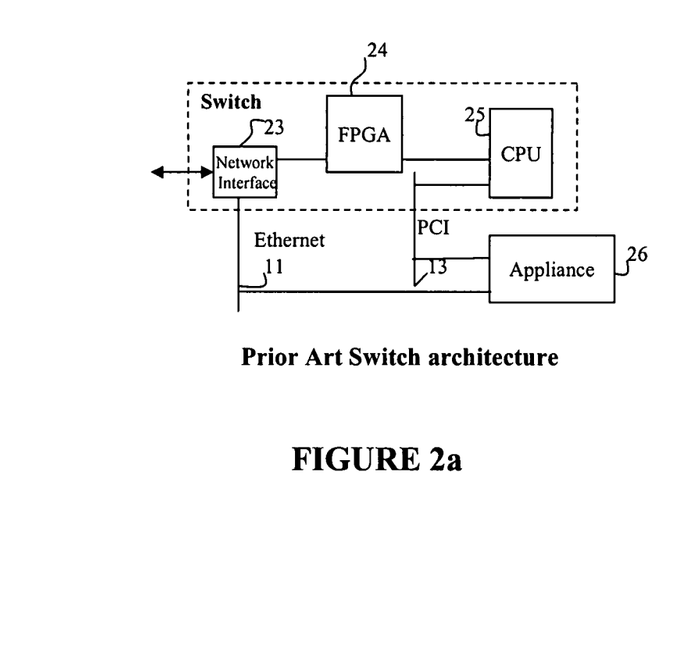
FIGS. 2A and 2B illustrate prior art Switch and Appliance architectures.

The above network gateway architecture can be implemented in hardware at a variety of granularity levels to improve the performance of existing architectures. For example, referring now to FIGS. 2a and 2b, the concepts of the present architecture may be used to enhance existing high performance switch and appliance architectures. One exemplary switch architecture is shown in FIG. 2a. As mentioned previously, in general the switch architectures are specifically designed to support high speed network switching. Other functionality is generally added to the switch via an appliance, such as appliance 26. The appliance is generally coupled to a host Central Processing Unit (CPU) via a Peripheral Computer Interconnect (PCI) connection 13, and uses some of the processing capabilities of the host to perform their function. The communication rate of the PCI interconnect often causes a bottleneck that results in sub-optimal performance of the appliance.

Figure 2B:
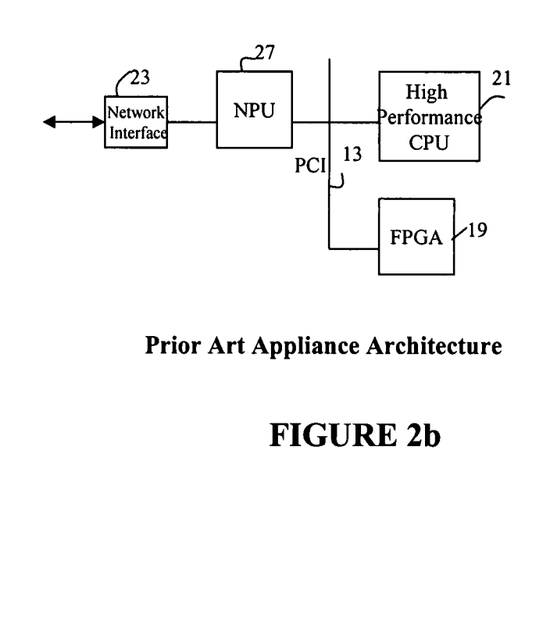

To improve the performance of appliances at the switch, appliance geared architectures such as that in FIG. 2b developed. The appliance architectures may include a high performance CPU for control plane processing, coupled to a Field Programmable Gate Array that is customized for data plane processing. The performance of the appliances is improved as a result of the dedicated processing power, but the impact of sharing the PCI bus between the control and data processor often lowers the expected performance.

Figure 3:
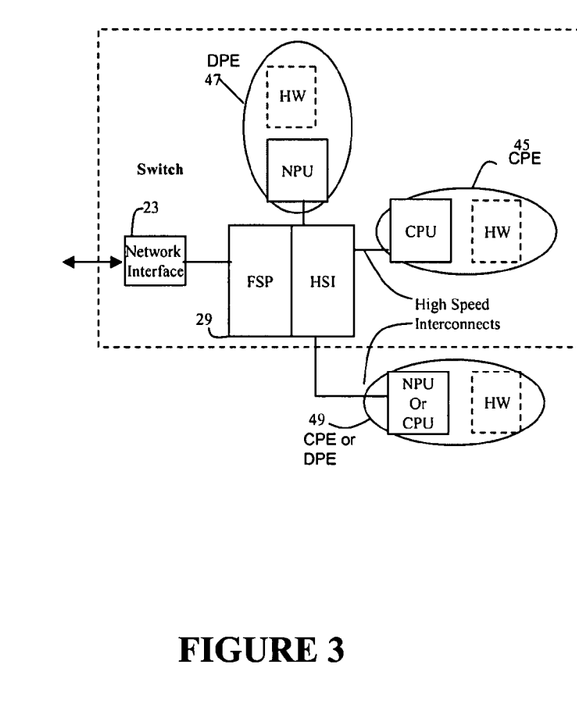
FIG. 3 illustrates one embodiment of a high performance switch/appliance architecture incorporating features of the present invention described with reference to FIG. 1.

However, referring now to FIG. 3, a high performance switch/appliance architecture can be provided by applying the modular architecture described in FIG. 1 to address the needs of the existing switch and appliance architectures. For example, in FIG. 3, a Frame Steering Processor and High Speed Interconnect (FSP/HSI) pair 29 is disposed between modular DPE and CPE components. The Network Interface Module 23 is used for communicating with the network. The DPE 47 may include, for example, a Network Processor Unit (NPU) and optional silicon for providing high speed support for the data path of the switch application. The FSP/HSI pair 29 is further coupled to CPE 45, where the CPE may be, for example, a CPU and optional silicon for providing support for the control path of the switching application. Also coupled to the switch via the FSP/HSI is an Application Module (AM) 49, which may be either a CPE or DPE, depending upon the specific appliance with which the application module 49 associated. In one embodiment, multiple application modules (AMs) may be provided, each having differing processing capabilities that may allow the device to be better suited to perform specific types of applications. Optional accelerators, indicated as dashed Hardware (HW) blocks may be used to further enhance the capabilities of any of the CPEs or DPEs.

Thus, the improved modular switch/appliance architecture of FIG. 3 may be used to provide appliance functionality to the switch architecture without affecting the performance of the switch, and also optimizing the performance of the appliances. The architecture is flexible and scalable. High speed interconnects coupled to the Frame Steering processor may allow additional functionality to be added to the switch by the insertion of blades to the switch. Added appliances may advantageously be programmed to take advantage of the underlying architecture by apportioning their flows into control and datapath specific flows, thereby improving the performance of the appliance.

It should be noted that FIG. 3 illustrates only one embodiment of an integrated switch/appliance architecture, and although certain functionality has been shown as logical separate entities, this is not a limitation of the invention. For example, Frame Steering Processor (FSP) 29 may either be integrated into the existing switch as shown in FIG. 3, or provided on a separate blade coupled to the switch.

Figure 4:
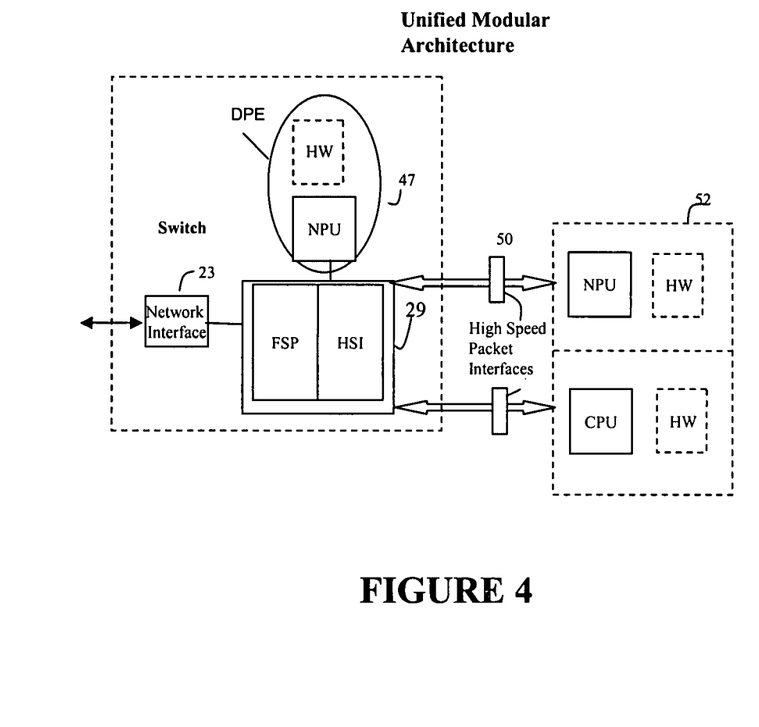
FIG. 4 is a block diagram illustrating one embodiment of a unified switch/appliance network architecture of the present invention.

Referring now to FIG. 4, an alternative embodiment of the network gateway architecture 10 is shown, where the CPEs and DPEs are selected in a manner that unifies the switch/appliance processing capabilities to reduce duplication of processing components, yet allow for the optimization of appliance performance. In order to ensure that the broadest range of appliances can be supported, consideration needs to be paid to what types of functions are provided at the respective Processing Engines; and the communication bandwidth potential of each link to each PEs. Determining which operations should be performed by which types of Processing Engines (PEs) is largely driven by design criteria including power, area, cost, time to market and performance, among other criteria. For example, if time to market is a key design pressure, the use of a custom designed ASIC would be outweighed in favor of an off the shelf processor that could perform some functionality, with a lower degree of performance.

Generally speaking, however, certain functions are best performed by a dedicated Datapath PE because of its particular architecture and communication bandwidth. These functions may include, but are not limited to Network Address Translation, Bulk encryption/decryption, compression/decompression, pattern matching functions. Because one or more DPEs may be provided in the design, each having different interconnect bandwidth capabilities, different functions may be allocated to different DPEs.

Similarly, different Control PEs having different capabilities may also be included in the design. For example, a high performance CPE, architected to support complex and high speed calculations may be used to provide support for load balancing algorithms, SSL protocol handshakes, TCP handshakes and the like. Another CPE of lower performance or reduced bandwidth capabilities may be used to provide host/management functionality such as filter preprocessing, action and alert post-processing.

FIG. 4 is, a block diagram of one embodiment of a unified appliance/switch architecture, wherein various DPEs and CPEs having specified functionality have been selected. In FIG. 4, the network gateway is shown to include the FSP/HSI pair 29.

Coupled to the FSP/HSI pair 29 are a set of one or more application modules 52. The application modules can be used to provide enhanced functionality for a given application, and may include optional acceleration silicon, depending upon design needs. Each Application Module (AM) can be either a custom or off the shelf device. Each AM is coupled to the FSP/HSI via a high speed packet interface, such as interface 50, although it is understood that the capabilities of each packet interface may vary.

Figure 5:
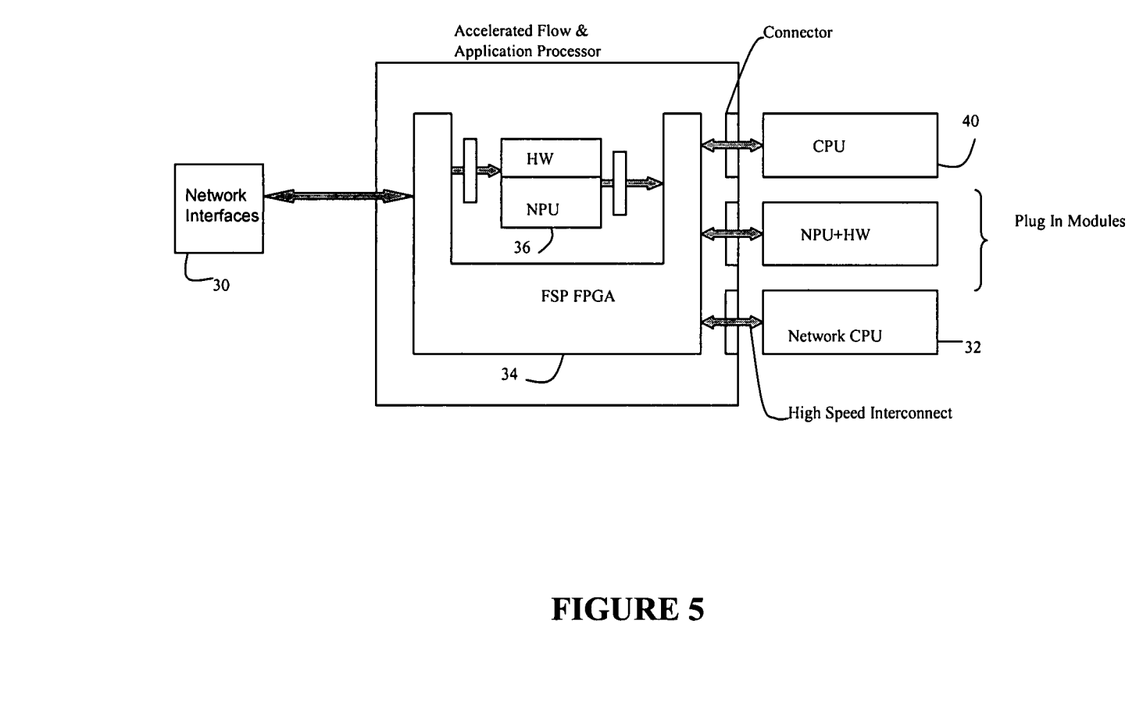
FIG. 5 is a diagram illustrating one embodiment of the unified switch/appliance architecture of FIG. 4.

Referring now to FIG. 5, one embodiment of the unified architecture of FIG. 4 is shown, wherein an Accelerated Flow and Application Processor (AFAP) incorporates the functionality of the Frame Steering Processor, High Speed Interconnect and the DPE 45 (providing data path processing for the switching application). In the embodiment of FIG. 5, a Field Programmable Gate array (FPGA) is used to provide the High Speed Interconnect functionality. The FPGA may also implement the FSP functionality, or alternatively portions of the FSP functionality may be implemented by the NPU. As shown in FIG. 4, the FPGA is disposed between a Network Interface 40 and a pair of Processing Engines (PEs) including an NPU 36 and a Network CPU 32. In one embodiment the FPGA is designed using the Xilinx 2VP100 FPGA.

Also coupled to the AFAP via a connectorized high speed interconnect is a CPU-based Application Module which may be used for control plane or data plane processing or both. 40. In one embodiment, the High Performance Networking CPU 32 is used for Control Plane processing, and may be, for example, a Motorola MPS 8540, by Motorola Corporation. the PMC-Sierra RM9000 (RM9K) by Sierra, and other alternative processor, or customized ASICS. The Network Processing Unit (NPU) 36 may be dedicated to performing specific network functions and data plane processing at high performance rates. An exemplary device that may be used for data plane processing by NPU 36 is the Intel IXP2800/2850 Castine device, by Intel Corporation, although similar devices may alternatively be used and the present invention is not limited to any particular device . . . .

According to one embodiment of the invention, as packets are received from the Network Interface (NI) 40, they are forwarded to the FPGA 34. The FSP examines certain fields of the packet to identify the type and function of the packet. The exact field of the packets may vary depending upon the communication protocol, but in essence the FSP examines the header fields to identify certain aspects such as the service level of the packet, the security parameters, the type (control, data), etc.

In one embodiment, the FSP automatically forwards the packet to the NPU for first processing. In an alternative embodiment, the FSP includes additional filtering functionality that enables it to determine whether the packet is a control type packet or a data type packet. Using this information, the FSP appends a tag to the header, and forwards it to output logic in the FSP. The tag effectively acts as a port number, enabling the FSP to switch forward the packet to the appropriate attached PE.

When the PE receives the packet, it processes it as necessary and modifies the tag to indicate its next destination PE, and forwards the packet back to the FSP. The FSP may either pass the packet through the switching fabric directly, or optionally may be programmed to alter the destination PE indicated by the tag to re-direct the packet. Such a re-direction may be desirable when the originally indicated PE is busy and the operational task associated with the packet can be handled by another PE.

Thus, various embodiments of the present invention have been shown. In FIG. 3, a modified high performance switched appliance architecture is enhanced to include frame steering capabilities between the host and custom blades. In FIGS. 4 and 5, a unified switch/appliance architecture has been described that is architected to enable the best Processing Engine to be selected for any given task, whether the task is switch or appliance oriented, or whether it is control or data oriented. In FIG. 5, the FSP functionality and the High-Performance Interconnect are shown combined into an integrated implementation on an FPGA device. The two different embodiments illustrate that the present invention is not limited to the forwarding of a packet, task or flow to any dedicated processing engine. Rather, the optimum engine can be dynamically selected depending upon the needs of the packet, task, or flow, and also on the current operating status of the other PEs in the gateway. Thus, it is envisioned that, if a given CPE is busy, the FSP may be programmed to alter the flow of the packet to any available CPE or DPE.

Accordingly, both the PEs and the FSP may be dynamically programmed to redirect traffic through the network device to accommodate the operating needs of a given appliance. Of course the operating needs of a given appliance may vary. For example, the appliance may be a packet processing application where the same function is performed on every packet of a given flow (the headers of a packet are used to identify a flow) or a flow processing application where a function is applied to the control portion of the flow and a different function may be applied to the data portion of the flow. Whether an appliance is a packet processing application or a flow processing application, the FSP appropriately modifies the tags to direct the respective packets to the appropriate destinations for processing using the information in the header of the packet.

Figures 6A, 6B:
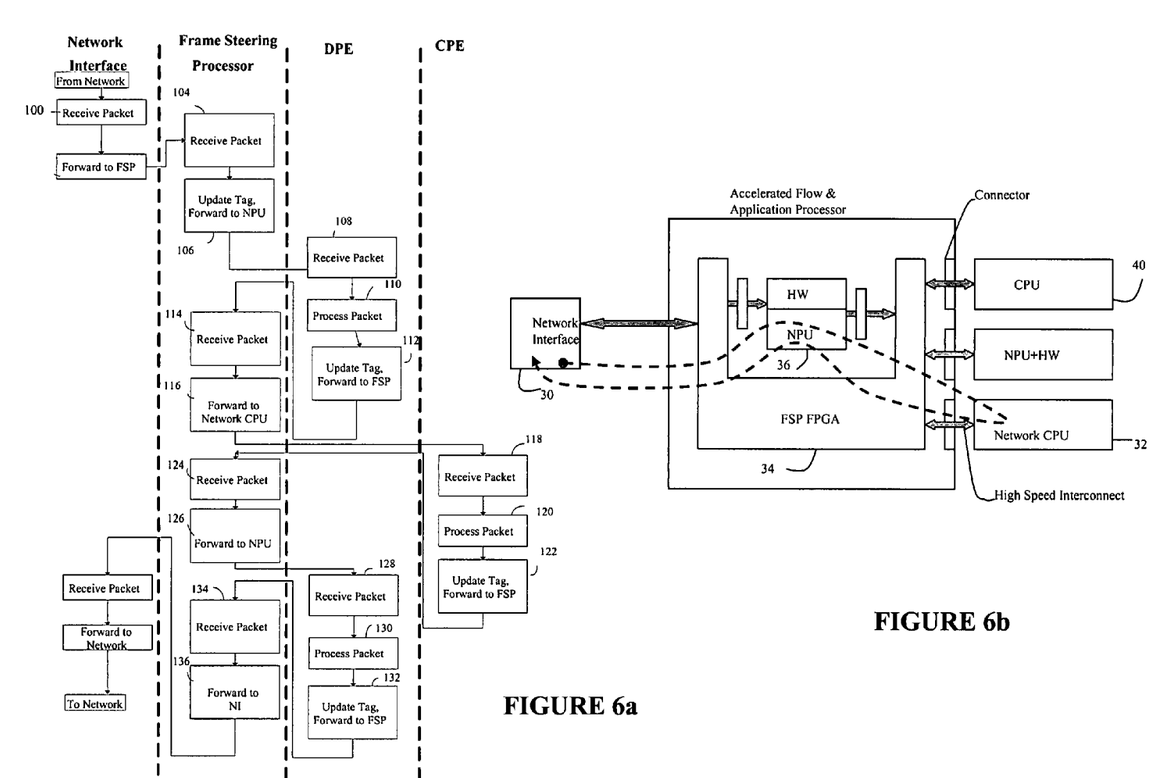
FIGS. 6A and 6B are functional flow diagrams and block diagrams, respectively, of the flow of a packet through a network device architected according to the present invention.

Referring briefly now to FIGS. 6A and 6B, the flow of a packet through the network device will now be described with reference to flow diagram 6A and diagram 6B. Note that FIG. 6A is a functional flow diagram, illustrating steps that are taken at the different devices to complete the transaction.

At step 100 the Network Interface receives a packet, and forwards it to the FSP at step 102. At step 104, the FSP receives the packet, analyzes the packet to determine the destination and forwards it to the NPU at step 106. At step 108, the NPU receives the packet, at step 110 processes it and at step 112 updates the tag and forwards it to the FSP. Note that the NPU had determined that the next operative task to be performed on the packet is to be performed by the Network CPU. Thus, at step 116 the FSP forwards the packet to the Network CPU. The network CPU receives the packet, processes it, and determines that more work needs to be done on the packet by the NPU. It therefore updates the tag with the NPU identifier, and forwards it to the FSP. The FSP receives the packet, and forwards it through the FSP to the NPU at step 126. The NPU completes the work on the packet, and updates the tag at step 132 to indicate that it should be forwarded to the network interface. The FSP receives the packet and forwards it through to the network interface, which subsequently forwards it to the network at step 140. The path of the packet through the network device is shown in FIG. 4B.

Above it has been described that the tag is a field appended to the packet. In one embodiment, the tag is a multi-bit field, which may be used to either encode an identifier or set a flag indicating the output port that the packet is to use to exit the FSP, where the output port corresponds to the coupled Processing Engine or network interface. Other methods that are known in the art of identifying output ports using tags that are either pre-pended to a packet header or placed in other fields within the packet may be substituted herein, and the present invention is not limited to any particular form of tag.

Figure 7A:
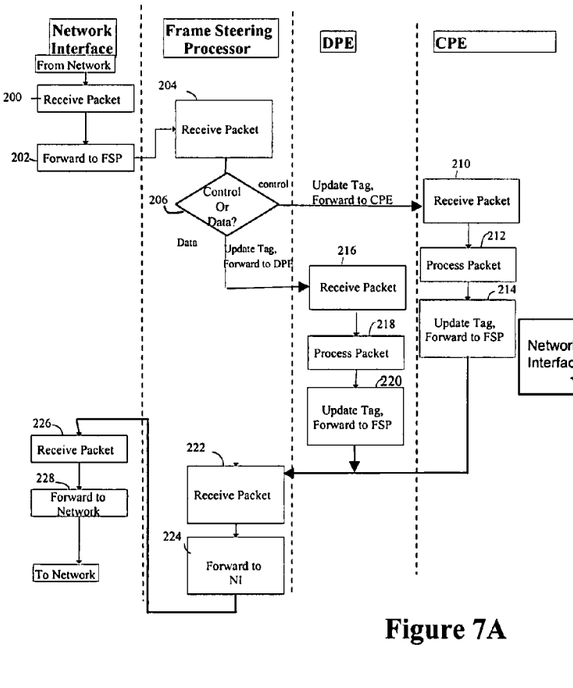
FIGS. 7a and 7b are diagrams illustrating the separate processing paths that packets in a common flow may take for dedicated control or data handling according to the present invention.
Figure 7B:
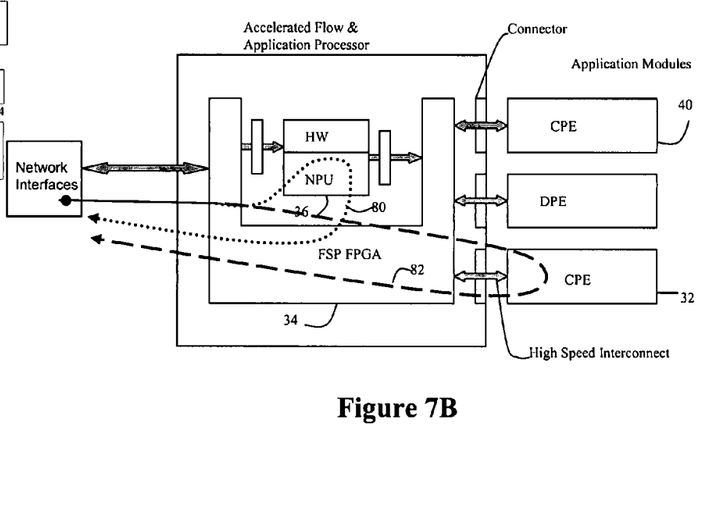

Referring now to FIGS. 7A and 7B, a flow diagram and block diagram, respectively, illustrating the separation of control and data plane processing of a control flow is shown. In FIG. 7A, at step 200 a flow is shown received at the network interface, and forwarded to the FSP at step 204. The FSP determines whether the packets are control plane or data plane specific packets at step 206, and forwards the packets to the appropriate CPE or DPE. Control plane specific packets are shown, in this embodiment, to be forwarded directly to the application specific module for handling via dashed path 82. Data plane specific packets are forward on the dotted path 80. Alternatively, the control plane packets could be forwarded to the NPU for processing either prior to forwarding to the application specific AM, or at any time thereafter, and the present invention is not limited to any specific pathways of the control or dataplane packets. Rather, FIGS. 7a and 7b illustrate that packets from the same flow may be forwarded to different processing modules to obtain the optimum performance for both control plane and data plane processing. Following processing by the CPE or DPE, the packets are shown to be returned to the FSP for forwarding out the network interface.

Figure 8:
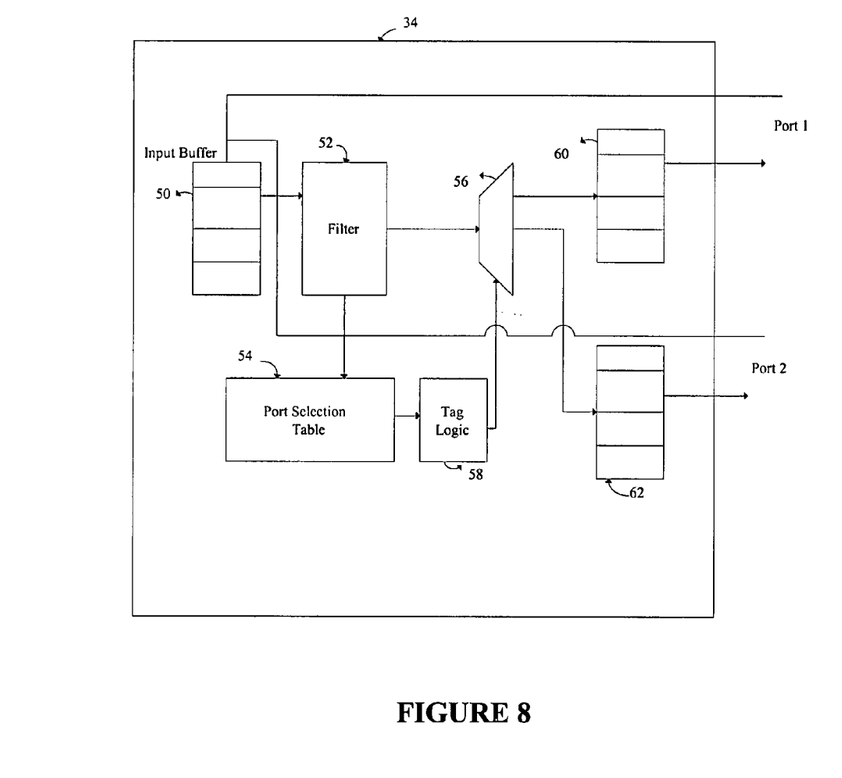
FIG. 8 is a block diagram illustrating exemplary components that may be included in a frame steering processor included in network device architected according to the present invention.

Referring now to FIG. 8, a block diagram illustrating exemplary components that may be included in the FSP are shown. It should be noted that although only two ports are shown here, as described above there may be multiple ports, and the present invention is not limited to any particular arrangement of port. Each port is shown to include a bidirectional connection, with input from each port being forwarded to an input buffer 50. The input buffer is used to collect the packet until sufficient information is obtained to allow it to proceed to the filter logic 52, or alternatively as a holding device for holding packets while others are being processed by the FSP. The filter 52 parses the header of the packet to determine certain treatment characteristic of the packets that may be used to determine which port (i.e., processing engine) should be used to process the packet. The treatment characteristics may include but are not limited to, a quality of service at which the packet is to be delivered, a security association that is to be applied to the packet, a type of operation that is to be performed on the packet, a stage of operation of the packet (i.e., whether other stages of processing need to be performed) a type of the packet, whether the packet is a control plane packet or data plane packet, whether the appliance is a flow based application or packet based application among other things. The filter strips this information and forwards it to the port selection table 54. The port selection table 54 includes a look-up table which uses the criteria received from the filter to access any pre-programmed port selection information stored in memory, to select a desired output port and, by default, a processing engine to which to forward the packet.

When the port has been selected, it is forwarded to the tag logic 58, which builds a tag to append to the header of the packet. The tag logic additionally drives a selector 56 which forwards the packet to a correct port output buffer 60 or 62, depending upon the selected tag.

Other features may also be included in the FSP, and it should be noted that FIG. 8 is used to show only one representative implementation of the above described frame steering functionality.

Accordingly, an architecture, method and apparatus has been shown and described that enables appliances, such as Content Delivery Services to be executed on networking devices without impacting the optimal performance of either the network device of the CDS. The described gateway of FIGS. 1-7 may be implemented in a variety of configurations, including as a single board with the integrated switch function and application processors, as a mother board with switch function, and add on application processor daughter cards, or as a blade chassis with switch and application blades.

Having described various embodiments of the invention, it is understood that the present invention is not to be limited in scope by the specific embodiments described herein. Indeed, various modifications of the present invention, in addition to those described herein, will be apparent to those of ordinary skill in the art from the foregoing description and accompanying drawings. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. For example, though the invention has been described in the context of a networked system on which content delivery services may be layered, it will be apparent to the skilled artisan that the invention is applicable in any system which may need to support appliance applications. The skilled artisan will realize that there are many equivalent ways of implementing the described functionality, and all such modifications are intended to fall within the scope of the following appended claims. Accordingly, the claims set forth below should be construed in view of the full breadth and spirit of the present invention as disclosed herein.

I claim:

1. A network device comprising:
a network interface for transferring a packet between the network device and a network;
at least two processing engines, including a first processing engine embodied in a first physical component and a second processing engine embodied in a second physical component;
a frame steering processor, connected between the network interface and the at least two processing engines, the frame steering processor being programmed to forward there through, without use of a shared bus, a packet received at the frame steering processor from either the network interface or one of the at least two processing engines to either the network interface or one of the at least two processing engines responsive to a treatment characteristic of a destination address of the packet, the treatment characteristic being an order of the operation associated with the packet.

2. A network device comprising:
a network interface for transferring a packet between the network device and a network;
at least two processing engines, including a first processing engine embodied in a first physical component and a second processing engine embodied in a second physical component;
a frame steering processor, connected between the network interface and the at least two processing engines, the frame steering processor being programmed to forward there through, without use of a shared bus, a packet received at the frame steering processor from either the network interface or one of the at least two processing engines to either the network interface or one of the at least two processing engines responsive to a treatment characteristic of a destination address of the packet, the treatment characteristic being a type of operation associated with the packet.

3. The network device of claim 2, wherein each of the processing engines performs tasks of different complexity, and wherein the frame steering processor forwards packets having a first complexity to one of the processing engines corresponding to the first complexity.

4. The network device of claim 2, wherein each of the processing engines performs different types of operations, and wherein the frame steering processor forwards packets associated with a first task to the processing engine associated with the first task.

5. The network device of claim 2, wherein the treatment characteristic is represented in a multi-bit tag pre-pended to the packet.

6. The network device of claim 5 wherein at least one of the at least two processing engines includes logic for modifying the tag of the packet and forwarding the tag and packet back to the frame steering processor.

7. The network device of claim 5 wherein the frame steering processor includes logic for modifying the tag of the packet.

8. The network device of claim 2, wherein one of the at least two processing engines is reserved for performing control type functions on the packet.

9. The network device of claim 2, wherein one of the at least two processing engines is reserved for performing data path functions.

10. The network device of claim 2, wherein data path functions are performed in the frame steering processor.

11. A method of processing packets received at a network device comprising the steps of:
receiving a packet at a network interface of the network device; forwarding the packet to a frame steering processor, coupled to the network interface;
responsive to a treatment characteristic associated with the packet, the treatment characteristic being an order of the operation associated with the packet the frame steering processor forwarding there through, without use of a shared bus, the packet to a selected one of at least two processing engines or the network interface, the processing engines including a first processing engine embodied in a first physical component and a second processing engine embodied in a second physical component; and
the selected one of the at least two processing engines processing the packet, modifying a tag of the packet and forwarding the packet to the frame steering processor.

12. The method of claim 11, wherein the characteristic is indicated in a tag appended to the packet, and wherein the method further includes the steps of:
modifying the tag at either one of the at least two processing engines; forwarding the packet including the modified tag to the frame steering processor; and
responsive to the modified tag, forwarding the packet by the frame steering processor to either one of at least two processing engines or the network interface.

13. A method of processing packets received at a network device comprising the steps of:
receiving a packet at a network interface of the network device; forwarding the packet to a frame steering processor, coupled to the network interface;
responsive to a treatment characteristic associated with the packet, the treatment characteristic being a type of operation associated with the packet, the frame steering processor forwarding there through, without use of a shared bus, the packet to a selected one of at least two processing engines or the network interface, the processing engines including a first processing engine embodied in a first physical component and a second processing engine embodied in a second physical component; and
the selected one of the at least two processing engines processing the packet, modifying a tag of the packet and forwarding the packet to the frame steering processor.

14. The method of claim 13, wherein the treatment characteristic is inferred by a tag appended to the packet, and wherein the method further includes the step of modifying the tag at the frame steering processor.

15. A method of processing packets in a network device including the steps of:
receiving a packet at a network interface;
forwarding the packet to a frame steering processor, the frame steering processor having multiple output ports in communication with multiple physical components;
at the frame steering processor, detecting a treatment characteristic of a packet and appending a multi-bit tag to the packet in accordance with the treatment characteristic, the treatment characteristic being an order of the operation associated with the packet;
forwarding, by the frame steering processor without use of a shared bus, the tag and the packet to one of the multiple output ports associated with a selected one of a corresponding multiple of processing engines responsive to the treatment characteristic of the packet and capabilities of the selected processing engine; and
processing the packet at the selected processing engine to provide a processed packet including updating the tag associated with the packet and returning the updated tag and processed packet to the frame steering processor.

16. A method of processing packets in a network device including the steps of:

receiving a packet at a network interface;

forwarding the packet to a frame steering processor, the frame steering processor having multiple output ports in communication with multiple physical components;

at the frame steering processor, detecting a treatment characteristic of a packet and appending a multi-bit tag to the packet in accordance with the treatment characteristic, the treatment characteristic being a type of operation associated with the packet;

forwarding, by the frame steering processor without use of a shared bus, the tag and the packet to one of the multiple output ports associated with a selected one of a corresponding multiple of processing engines responsive to the treatment characteristic of the packet and capabilities of the selected processing engine; and processing the packet at the selected processing engine to provide a processed packet including updating the tag associated with the packet and returning the updated tag and processed packet to the frame steering processor.

* * * * *